(12) United States Patent
Ho

(10) Patent No.: US 8,218,938 B2
(45) Date of Patent: Jul. 10, 2012

(54) LIGHT GUIDE STRIP STRUCTURE

(76) Inventor: Chang-Hsien Ho, Taoyuan County (TW)

(*) Notice: Subject to any disclaimer, the term of this patent is extended or adjusted under 35 U.S.C. 154(b) by 387 days.

(21) Appl. No.: 12/458,182

(22) Filed: Jul. 2, 2009

(65) Prior Publication Data

US 2011/0002589 A1 Jan. 6, 2011

(51) Int. Cl.
*G02B 6/00* (2006.01)
*F21V 8/00* (2006.01)

(52) U.S. Cl. ........ 385/147; 385/123; 385/146; 362/551; 362/565; 362/576

(58) Field of Classification Search .................. None
See application file for complete search history.

(56) References Cited

U.S. PATENT DOCUMENTS

| | | | | |
|---|---|---|---|---|
| 4,234,907 A | * | 11/1980 | Daniel | 362/556 |
| 5,027,259 A | * | 6/1991 | Chujko | 362/582 |
| 5,982,969 A | * | 11/1999 | Sugiyama et al. | 385/123 |
| 6,519,401 B1 | * | 2/2003 | Imamura et al. | 385/123 |
| 7,079,748 B2 | * | 7/2006 | Arkhipov et al. | 385/141 |
| 2002/0030990 A1 | * | 3/2002 | Wang | 362/219 |
| 2003/0035289 A1 | * | 2/2003 | Fan Wong | 362/235 |

OTHER PUBLICATIONS

Derwent abstract of TW 201038986A (published Nov. 1, 2010).*
Derwent abstract of DE 202009007851 U1 (published Sep. 24, 2009).*
Derwent abstract of CN 201496887 U (published Jun. 2, 2010).*
Derwent abstract of CN 101900298 A (published Dec. 1, 2010).*

* cited by examiner

*Primary Examiner* — Mike Stahl
(74) *Attorney, Agent, or Firm* — Rosenberg, Klein & Lee

(57) ABSTRACT

A light guide strip structure with neon effect, which is manufactured at lower cost and can be used with the bright-and-dark stripes or diffraction and interference between the light rays minimized. The light guide strip structure includes a transparent main body having a light-scattering surface and a color band disposed in the main body. The color band has a reflective index greater than that of the main body, whereby most of the light is reflected back to the main body and only a minor part of the light enters the color band to create neon effect. The light entering the main body substantially travels along an axis thereof. The light is refracted and reflected between the main body and the color band and scattered from the surface of the main body to enhance brightness and overcome the problem of vagueness.

32 Claims, 6 Drawing Sheets

LIGHT GUIDE STRIP STRUCTURE

BACKGROUND OF THE INVENTION

The present invention relates generally to a light guide structure, and more particularly to a light guide strip structure composed of a transparent main body and a color band embedded in the main body. The light is refracted and reflected between the main body and the color band and scattered from the surface of the main body to create neon effect.

A conventional light guide generally includes a transparent core body and a protective layer or a thin sleeve coated on the surface of the core body. The core body is made of a thermoplastic plastic material such as PC, PU, Ethyl, Methyl Acrylate or the like polymer material. The protective layer or sleeve is made of PE material. For example, U.S. Pat. No. 4,422,719, entitled "optical distribution system including light guide", discloses a combination of transparent core body and a semitransparent sleeve. The sleeve has a refractive index greater than that of the core body to enhance light reflection and elongate the travel distance of the light within the core body as well as uniform and soften the scattered or diffused light. However, the sleeve will blur the scattered light and deteriorate the brightness. This is proved from the product of the above patent.

There is another factor causing the vagueness of the scattered light. That is, the inner surface of the sleeve and the surface of the core body are very close to each other. It is very possible that the light ray reflected from one of the surfaces is interfered with and offset by the light ray reflected from the other of the surfaces. For example, in case that the light source projects white light and the thickness of the sleeve is relatively thin, the blue light in the white light is apt to be offset due to interference. Therefore, the light reflected to the eyes will become yellow light (complementary color to blue) with less brightness. When the thickness of the sleeve is increased, the green light in the white light is apt to be offset and a color complementary to green will appear. In other words, due to interference, the brightness of such light guide structure, in which the core body is coated with the sleeve, will be deteriorated.

To overcome this problem, U.S. Pat. No. 4,422,719 provides some other embodiments. For example, the sleeve and the core body are notched with marks arranged at different intervals. Alternatively, a photosensitive emulsion, reflective powder material or metal oxide is added into the sleeve for enhancing the brightness. However, this makes it more complicated to manufacture the light guide structure.

U.S. Pat. No. 6,169,836 B1 entitled "optical transmission tube and method for making the same" and U.S. Pat. No. 7,433,565 B2 entitled "side-scattering light guides" disclose light guide structures with core bodies and protective layers or sleeves coated on the core bodies. In the above patents, the refractive index of the core body is greater than the refractive index of the sleeve. However, the protective layer or the sleeve also will blur the scattered light and deteriorate the brightness and visual effect. This is also proved from their products.

In order to increase the brightness of the light guide structure, the core body is doped with light-scattering particles or diffuser particles made of organic polymers (such as silicone resin, PS resin, metal oxide, carbonate or the like material) for enhancing reflection and refraction of light. As known by those skilled in this field, it is relatively complicated to manufacture such light guide structure with the light-scattering particles or diffuser particles. This is because after the light-scattering particles are added into the resolved and polymerized core body, it is necessary to further distribute the light-scattering particles over the interior of the core body by means of vibration and rotation operation. The cost for such process is reflected on the price. Therefore, the price of a 20 cm long light guide strip is very high, up to 70~80 NT$.

There is another topic about the application of the light-scattering particles or diffuser particles to the light guide structure. That is, when the light projected into the core body encounters the light-scattering particles or diffuser particles, a shadow is often formed behind the light-scattering particles or diffuser particles to produce diffraction stripes on the edges of the shadow. In some cases, the diffraction stripes will mix with each other to blur the edges of the shadow. The diffraction extent is determined by the relationship between the sizes of the light-scattering particles or diffuser particles and the wavelength of the light. (For example, the longer the wavelength is, the more obvious the diffraction is.) Accordingly, only limited varieties of light sources are applicable to the light guide structure. This is unexpected.

U.S. Pat. No. 7,433,565 B2 discloses another embodiment in which an air layer or a medium layer is disposed between the core body and the sleeve. The air layer or medium layer has a refractive index smaller than that of the core body. In this case, the core body is spaced from the sleeve by the air layer so that the light rays will be respectively reflected from the upper and lower faces of the air layer. The reflected light rays will interfere with each other to produce alternate bright and dark stripes. This is because the light rays are reflected to the eyes respectively from the inner surface of the sleeve and the outer surface of the core body in different paths. The light ray reflected from the outer surface of the core body needs to travel through a longer distance to reach an observer's eyes. In the case that the distance difference is just half the wavelength (out of phase), offset interference will take place to produce dark band. In the case that the distance difference is such that no interference takes place, bright band is produced. That is, the light ray reflected from the inner surface of the sleeve and the outer surface of the core body, which is very close to the inner surface of the sleeve, will interfere with each other to produce interference stripes and reduce the brightness of the light rays.

It is therefore tried by the applicant to provide a light guide strip structure, in which the bright-and-dark stripes and diffraction existing in the prior art are minimized and the problem of interference between the light rays is improved to enhance the brightness. Also, the problem of vagueness existing in the prior art is overcome. The light guide strip structure has the following advantages:

1. In contrast to the above the patents (U.S. Pat. Nos. 4,422, 719, 6,169,836 B1 and 7,433,565 B2), the surface of the main body of the light guide strip structure is not coated with any protective layer or sleeve structure. Therefore, the vagueness or unclearness existing in the prior art can be minimized.
2. In contrast to U.S. Pat. Nos. 4,422,719, 6,169,836 B1 and U.S. Pat. No. 7,433,565 B2, the main body of the light guide strip structure is free from any light-scattering particle or diffuser particle so that the shadow or diffraction stripes are minimized. In this case, various light sources can be used without limitation. Also, the light guide strip can be manufactured at lower cost with less complicatedness.
3. The internal structure of the light guide strip is rearranged and redesigned to keep or enhance reflection and refraction of light.
4. The areas of the surfaces (such as the inner surface of the sleeve and the surface of the core body), which are very close to each other, are as reduced as possible. Accordingly, the offset and interference between the light rays reflected by the two surfaces or the bright-and-dark stripes are minimized.

SUMMARY OF THE INVENTION

It is therefore a primary object of the present invention to provide a light guide strip structure with neon effect. The light guide strip structure is simplified and manufactured at lower cost. In the light guide strip structure, the bright-and-dark stripes and diffraction existing in the prior art are minimized and the problem of interference between the light rays is improved.

To achieve the above and other objects, the light guide strip structure of the present invention includes a transparent main body having a light-scattering surface and a color band disposed in the main body. The color band has a reflective index greater than that of the main body, whereby most of the light is reflected back to the main body and only a minor part of the light enters the color band to create neon effect. The light entering the main body substantially travels along an axis thereof. The light is refracted and reflected between the main body and the color band and scattered from the surface of the main body to enhance brightness and overcome the problem of vagueness existing in the prior art.

In the light guide strip structure with neon effect of the present invention, the main body is a tubular or strip structure having a central axis. The color band is positioned at the axis of the main body. The ratio of the cross-sectional area of the main body to the cross-sectional area of the color band ranges from about 20:1 to 90:1. Therefore, the offset and interference between the light rays reflected by the main body and the color band or the bright-and-dark stripes are minimized.

In the light guide strip structure with neon effect of the present invention, multiple segments of color bands are arranged in the main body at intervals along the axis of the main body.

In the light guide strip structure with neon effect of the present invention, the main body is composed of two halves. Each of the two halves has a plane face and the color band is disposed on the plane face of at least one of the two halves. The color band is laid or printed on the plane face of the half and the two halves are associated into an integrated body.

The present invention can be best understood through the following description and accompanying drawings wherein:

DETAILED DESCRIPTION OF THE PREFERRED EMBODIMENTS

Figure 1:
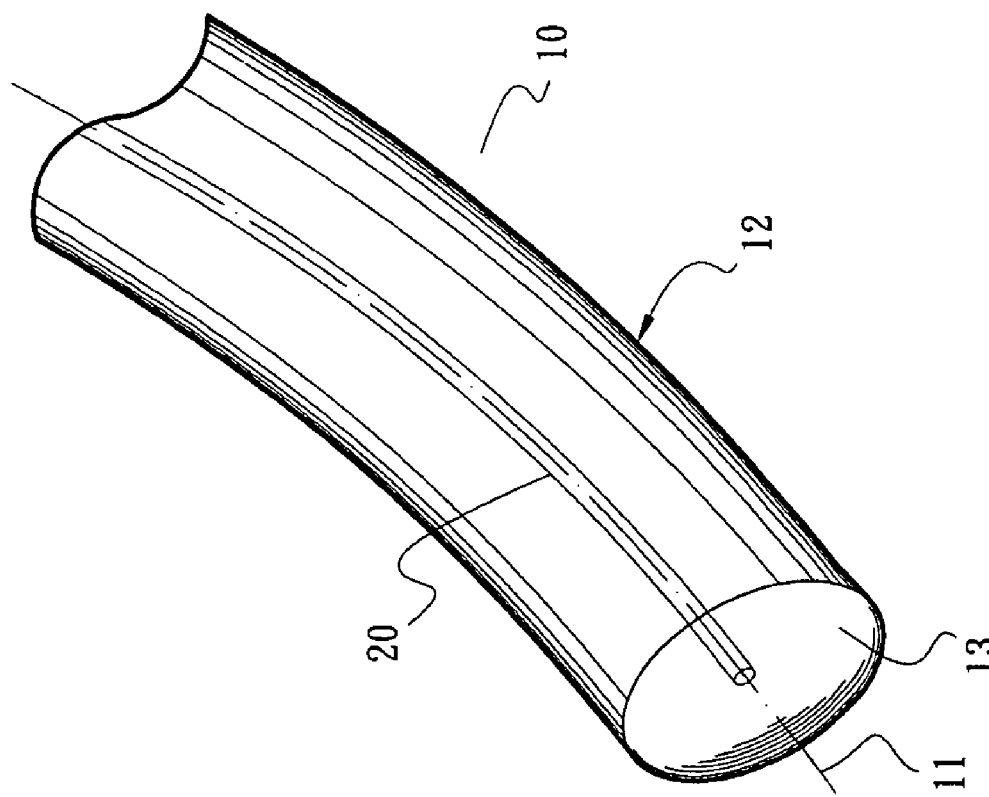
FIG. 1 is a perspective view of the present invention.
Figure 2:
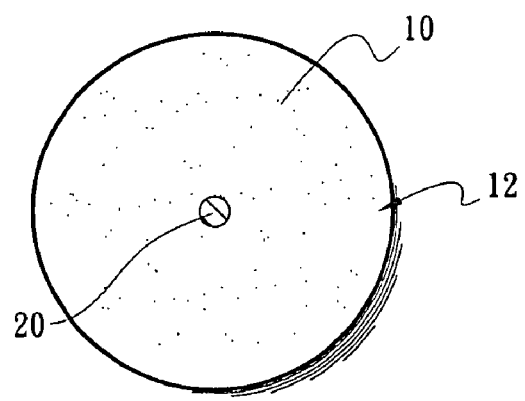
FIG. 2 is a cross-sectional view of the present invention according to FIG. 1.

Please refer to FIGS. 1 and 2. The light guide strip structure with neon effect of the present invention includes a main body 10 and at least one color band 20. The main body 10 is made of transparent plastic, PMMA, PU, glass, resin, thermoplastic plastic material or the like. (The materials of the main body have been disclosed in the prior art and thus will not be further described hereinafter.) According to a preferred embodiment, the main body 10 is a transparent flexible body with good refractivity and transparency (or transmission performance). In this embodiment, the main body 10 is formed with a circular cross-section and has a central axis 11 and a light-scattering surface 12. Alternatively, the main body 10 can be formed with any other suitable geometric shape.

In this embodiment, the color band 20 is a colored band body or strip body. The color band 20 is embedded in the main body 10 substantially at the axis 11 thereof. The color band 20 can be coated with silver or the like material to enhance reflectivity of the color band 20. In this embodiment, the color band 20 is red and has a reflective index greater than that of the main body 10. Accordingly, most of the light is reflected back to the main body 10 and only a minor part of the light is allowed to enter the color band 20 to create neon effect. Preferably, the color band 20 is made of a material with low light absorptivity and high transparency ratio, such as a cross-linked polymer. Accordingly, the light can be transmitted along the main body 10 and the color band 20 at high efficiency.

In this embodiment, the ratio of the cross-sectional area of the main body 10 to the cross-sectional area of the color band 20 ranges from about 20:1 to 90:1. In FIG. 2, it is shown that the ratio of the cross-sectional area of the main body 10 to the cross-sectional area of the color band 20 is about 60:1. In this case, the offset and interference between the light rays reflected by the main body 10 and the color band 20 or the bright-and-dark stripes can be minimized.

Figure 3:
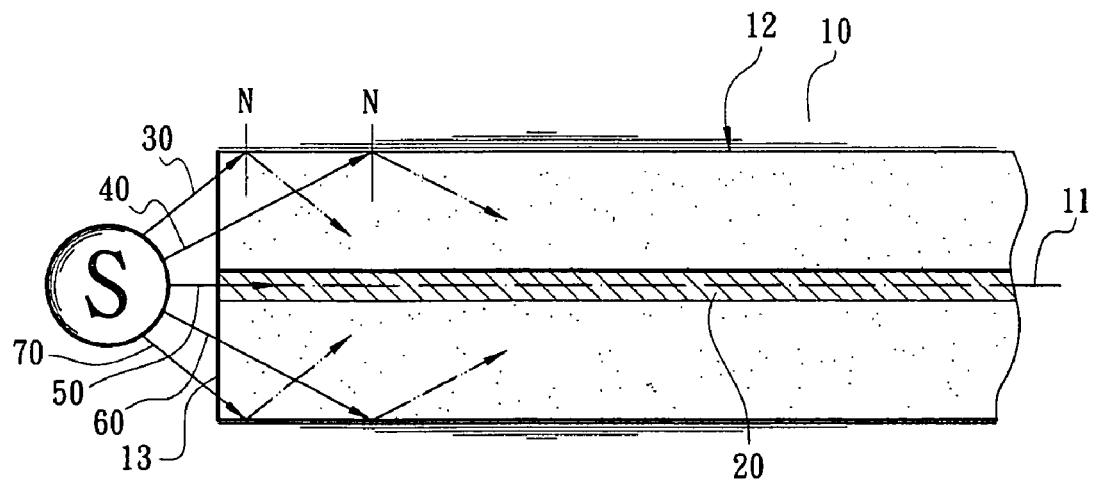
FIG. 3 is an axial sectional view of the present invention according to FIG. 1, showing the position of the light source.

Referring to FIG. 3, when the light emitted from a light source S is incident upon one end 13 of the light guide strip, the light is linearly transmitted along the light guide strip in a direction parallel to the axis 11 of the main body 10. When part of the light encounters the surface 12 of the main body 10 and the color band 20, the light is reflected and refracted within the main body 10. In the case that the incidence angle (the angle contained between the incident ray and the normal N) of the light ray upon the surface 12 of the main body 10 (or the color band 20) is smaller than the critical angle (the angle of incidence above which total internal reflection occurs in the light guide strip), part of the light will be refracted out of the main body 10 to emit beautiful scattered or diffused light from the surface 12 of the main body 10.

Figure 4:
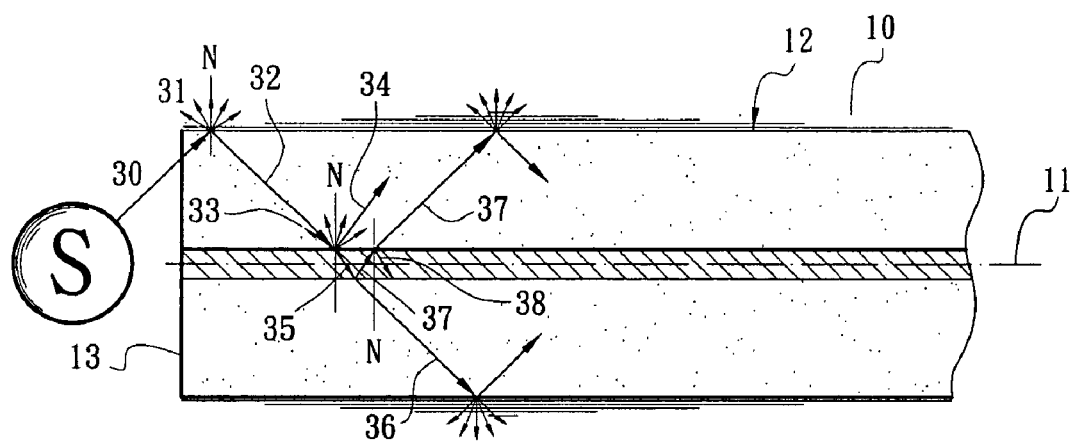
FIG. 4 is an axial sectional view of the present invention, showing the transmission path of the light ray 30.

Please refer to FIGS. 3 and 4 in which five light rays 30, 40, 50, 60 and 70 are shown for illustration. For example, in the case that the incidence angle of the light ray 30 upon the surface 12 of the main body 10 is smaller than the critical angle, part of the light ray will be refracted out of the main body 10 to emit beautiful scattered or diffused light 31 from the surface 12 of the main body 10. Other part of the light ray 32 is reflected onto the color band 20 to create scattered or diffused light 33 on the color band 20. The color band 20 further reflects part of the light 34 back to the surface 12 of the main body 12. However, a minor part of the light 35 is refracted into the color band 20. The path of the light 35 is deflected toward the normal N. Part of the light 36 is refracted out of the color band 20 toward the surface 12 of the main body 10 in a direction deflected away from the normal N. Part of the light 37 is reflected within the color band 20 and then refracted out of the color band 20 toward the surface 12 of the main body 10 in a direction away from the normal N. Part of the light 38 is reflected within the color band 20.

Figure 5:
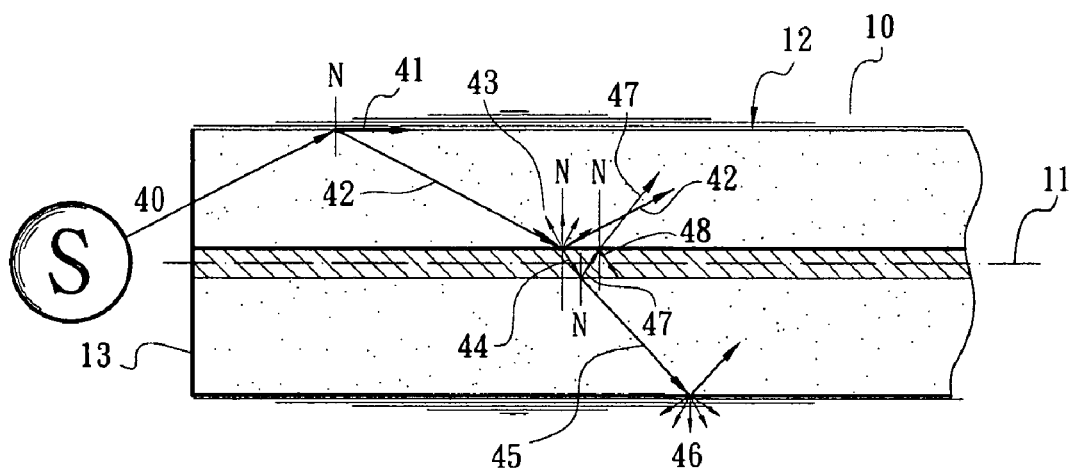
FIG. 5 is an axial sectional view of the present invention, showing the transmission path of the light ray 40.

Referring to FIG. 5, in the case that the incidence angle of the light ray 40 upon the surface 12 of the main body 10 is equal to the critical angle, the light ray 41 will travel along the surface 12 of the main body 10. In the case that the incidence angle of the light ray 40 upon the surface 12 of the main body 10 is larger than the critical angle, the light 42 will be totally reflected onto the color band 20 and then totally reflected from the color band 20. In another situation, the light 42 may be diffused from the color band 20 to create diffused light 43. Part of the light 44 is refracted into the color band 20 in a direction deflected toward the normal N. Part of the light 45 is refracted out of the color band 20 to the surface 12 of the main body 10 in a direction deflected away from the normal N. The light 45 is then scattered or diffused from the surface 12 of the main body 10 to create scattered or diffused light 46. Part of the light 47 is reflected within the color band 20 and then refracted out of the color band 20 to the surface 12 of the main body 10 in a direction deflected away from the normal N. Part of the light 48 is reflected within the color band 20.

It should be noted that the paths of the light rays 60, 70 are respectively identical to those of the light rays 30, 40 and thus will not be repeatedly described hereinafter.

Figure 6:
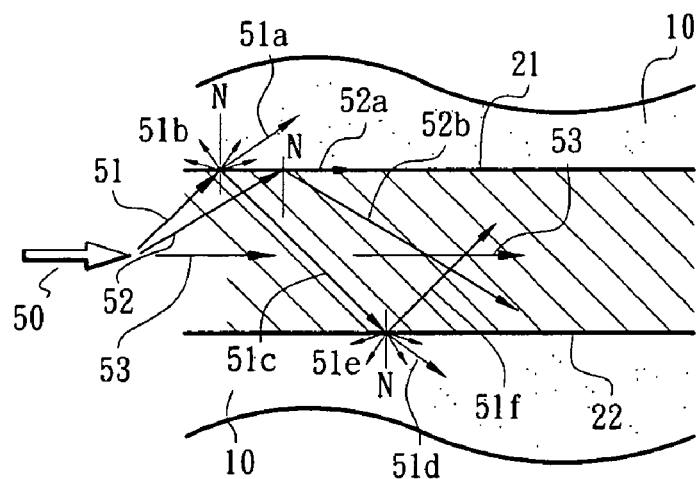
FIG. 6 is an enlarged view according to FIG. 5, showing the transmission path of the light ray 50 within the color band.

Please refer to FIG. 6. The sectional view of the color band 20 is enlarged and two sides of the color band 20 are respectively denoted with 21, 22. The light ray 50 entering the color band 20 is illustrated with light rays 51, 52 and 53. Basically, the light ray 53 will be transmitted linearly within the color band 20.

In the case that the incidence angle of the light ray 51 upon the surface of the color band 20, part of the light 51a is refracted out of the color band 20 into the main body 10 in a direction deflected away from the normal N. Also, part of the light 51b is scattered or diffused from the color band 20. Part of the light 51c is reflected to the other side 22 of the color band 20. Part of the light 51d is refracted out of the color band 20 into the main body 10 in a direction deflected away from the normal N. Part of the light 51e is scattered or diffused from the other side 22 of the color band 20. Part of the light 51f is reflected within the color band 20 to the side 21 of the color band 20.

Further referring to FIG. 6, in the case that the incidence angle of the light ray 52 upon the surface of the color band 20 is equal to the critical angle, the light 52a will travel along the surface or the side 21 of the color band 20. In the case that the incidence angle of the light ray 52 upon the surface of the color band 20 is larger than the critical angle, the light 52b will be totally reflected to the other side 22 of the color band 20.

It is described in the above that after the light is projected from the light source S into the light guide strip, the light rays 30, 40, 50, 60, 70 are refracted and reflected by the main body 10 and the color band 20. As aforesaid, the ratio of the cross-sectional area of the main body 10 to the cross-sectional area of the color band 20 ranges from about 20:1 to 90:1. Therefore, in practice, some light rays will pass by the color band 20 without being refracted or reflected by the color band 20. The transmission of the light rays 80, 90 passing by the color band 20 will be described hereinafter as shown in FIG. 7.

Figure 7:
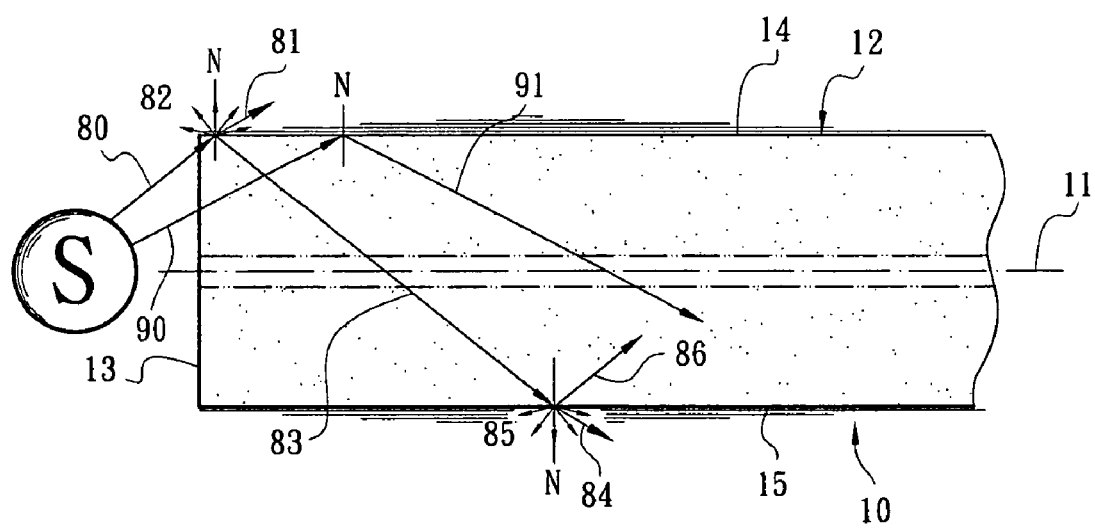
FIG. 7 is a plane view of the present invention, showing the transmission paths of the light rays 80, 90 within the main body.

Referring to FIG. 7, the surface 12 of the main body 10 is defined with two sides 14, 15 for illustration.

In the case that the incidence angle of the light ray 80 upon the surface 12 of the main body 10 is smaller than the critical angle, part of the light 81 will be refracted out of the main body 10 in a direction deflected away from the normal N. Also, part of the light 82 is scattered or diffused from the surface 12 of the main body 10. Part of the light 83 is reflected to pass by the color band 20 toward the other side 15 of the main body 10. Part of the light 84 is refracted out of the main body 10 in a direction deflected away from the normal N. Also, part of the light 85 is scattered or diffused from the other side 15 of the main body 10. Part of the light 86 is reflected within the main body 10 to the side 14 of the main body 10. In the case that the incidence angle of the light ray 90 upon the surface 12 of the main body 10 is larger than the critical angle, the light 91 will be totally reflected to pass by the color band 20 toward the other side 15 of the main body 10.

Figure 8:
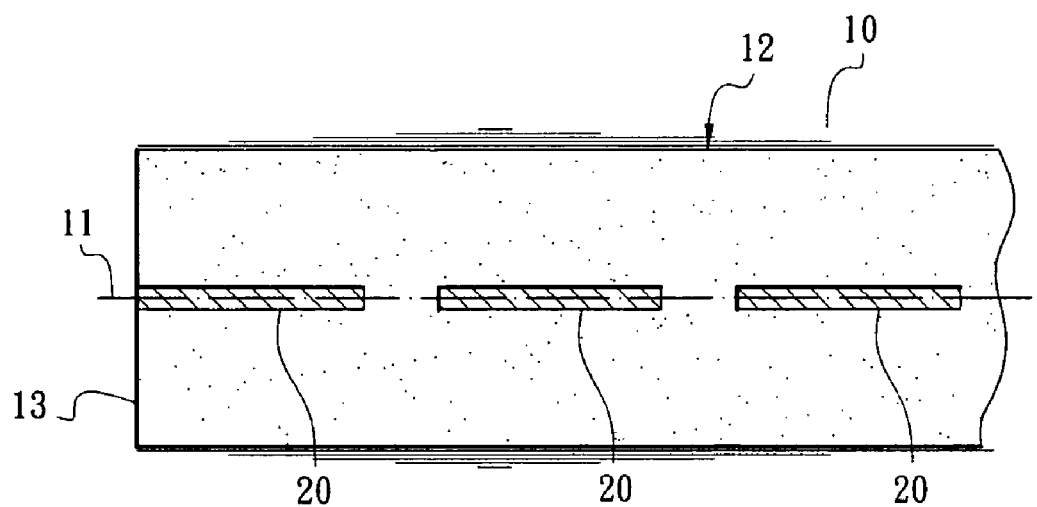
FIG. 8 is an axial sectional view of another embodiment of the present invention, showing the arrangement of the color bands in the main body.
Figure 9:
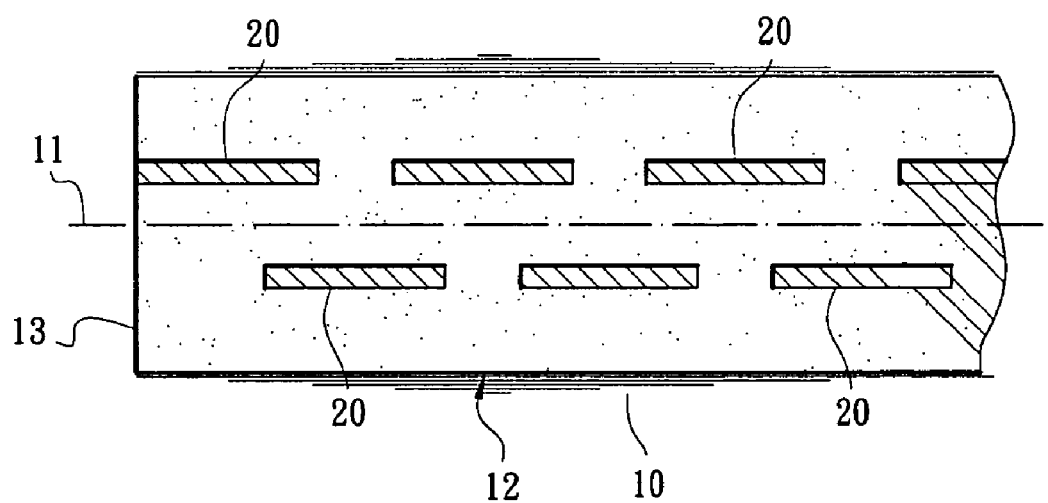
FIG. 9 is an axial sectional view of still another embodiment of the present invention, showing the arrangement of the color bands in the main body.

Please refer to FIG. 8, which shows a modified embodiment of the present invention. In this embodiment, multiple color bands 20 are arranged along the axis 11 of the main body 10 at intervals. In still a modified embodiment, multiple rows of color bands 20 are embedded in the main body 10 in parallel to each other as shown in FIG. 9.

Figure 10:
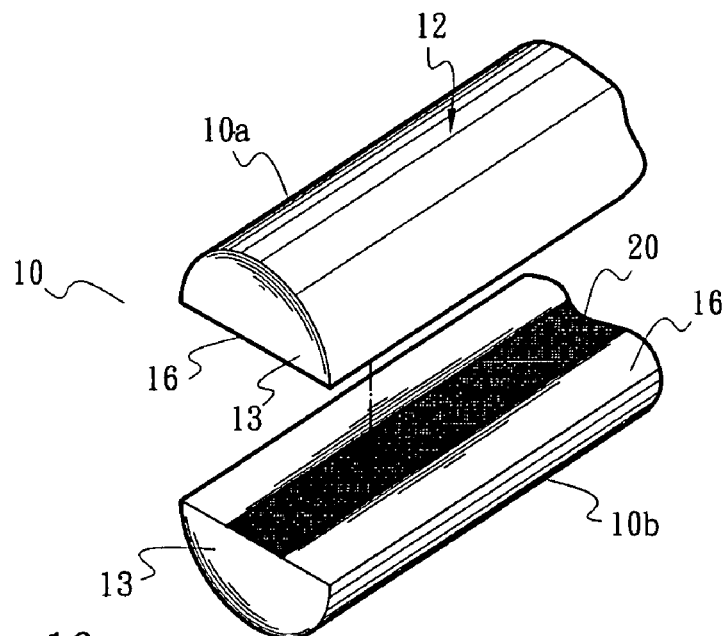
FIG. 10 is a perspective view of still another embodiment of the present invention, showing that the main body is composed of two halves and the color band is disposed on one of the two halves.
Figure 11:
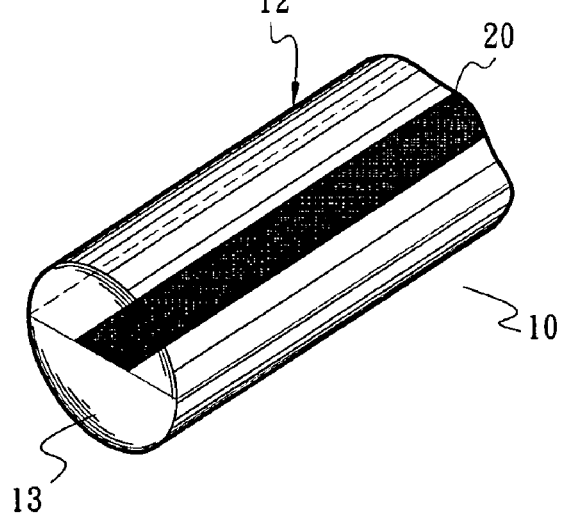
FIG. 11 is a perspective view according to FIG. 10, showing that the two halves are associated with each other.

FIGS. 10 and 11 show still another embodiment of the present invention, in which the main body 10 is composed of two halves 10a, 10b each having a plane face 16. The color band 20 is disposed on the plane face 16 of at least one of the halves 10a, 10b. In FIGS. 10 and 11, the color band 20 is disposed on the plane face 16 of the half 10b. In practice, the color band 20 can be laid or printed on the plane face 16 of the half 10b and the two halves 10a, 10b are integrally associated with each other to form the main body 10 (or light guide strip). In principle, the width and length of the color band 20 can be changed without exceeding the width and length of the plane face 16 of the half. In other words, the width of the color band 20 is smaller than the diameter of the main body 10 (the width of the plane face 16). The length of the color band 20 is not larger than the length of the main body 10 (the length of the plane face 16). That is, the length of the color band 20 is smaller than or equal to the length of the main body 10. In this embodiment, the two halves 10a, 10b are adhered to each other by means of an adhesive or connected with each other by means of high-frequency wave. Alternatively, the plane faces 16 of the two halves 10a, 10b are thermally connected with each other.

Figure 12:
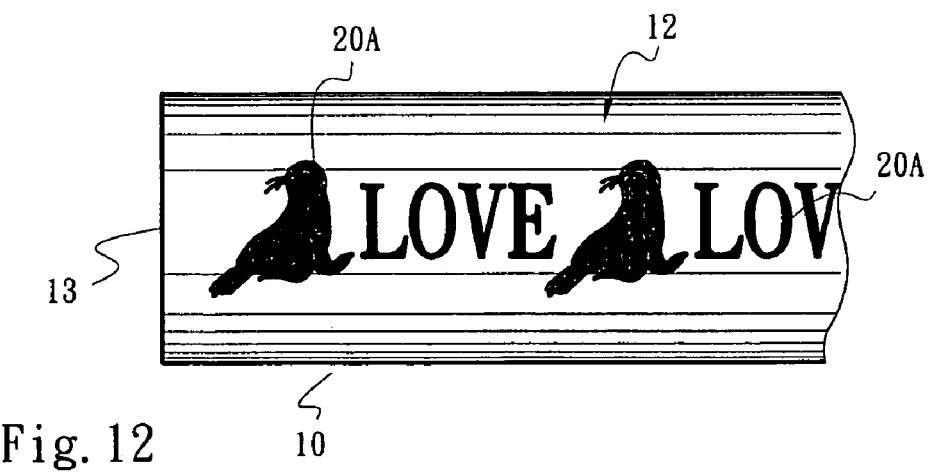
FIG. 12 is a top view of still another embodiment of the present invention, in which the color bands have different configurations.

Please refer to FIG. 12, which is a top view of still a modified embodiment of the light guide strip of the present invention. In FIG. 12, each color band 20 has the form of a character or a FIG. 20A.

In conclusion, the light guide strip with neon effect of the present invention has the following advantages:

1. In comparison with the prior art (such as U.S. Pat. Nos. 4,422,719, 6,169,836 B1 and 7,433,565 B2), the surface 12 of the main body 10 is not coated with any protective layer or sleeve structure. Therefore, the vagueness or unclearness existing in the prior art can be minimized.
2. In U.S. Pat. Nos. 6,169,836 B1 and 7,433,565 B2, the light-scattering particles or diffuser particles are distributed in the core body. In contrast, the light guide strip of the present invention is free from any light-scattering particle or diffuser particle. Therefore, the shadow or diffraction stripes are minimized. In this case, various light sources can be used without limitation. Also, the light guide strip can be manufactured at lower cost with less difficulty. With respect to a 20 cm long light guide strip made according to the present invention, the price is under about 10 NT$. In comparison with the prior art, the manufacturing cost of the present invention is apparently reduced so that the attraction of the present invention in the market is promoted.

3. The color band 20 is embedded in the main body 10 for keeping or enhancing reflection and refraction of light. In daytime, the light guide strip shows a special visual effect. After the light is projected from the light source S into the light guide strip, beautiful and clear light with neon effect is scattered from the light guide strip in daytime and at night. This is advantageous over the prior art.

4. The internal structure of the light guide strip is rearranged and redesigned without any two surfaces that are very close to each other as in the prior art. (In the prior art, the inner surface of the sleeve and the surface of the core body are very close to each other.) Accordingly, the problems of offset and interference between the light rays reflected by the two surfaces or the bright-and-dark stripes are obviously improved.

5. The ratio of the cross-sectional area of the main body 10 to the cross-sectional area of the color band 20 ranges from about 20:1 to 90:1. Therefore, the areas close to each other are as reduced as possible. Accordingly, the offset and interference between the light rays reflected by the main body 10 and the color band 20 or the bright-and-dark stripes are minimized.

The above embodiments are only used to illustrate the present invention, not intended to limit the scope thereof. Many modifications of the above embodiments can be made without departing from the spirit of the present invention.

What is claimed is:

1. A light guide strip structure with neon effect for guiding and transmitting a light ray, the light guide strip structure comprising:
    a transparent main body having a central axis and a light-scattering surface; and
    a color band disposed in the main body, the color band having a reflectivity greater than that of the main body, whereby most of the light ray is reflected back to the main body and only a minor part of the light ray enters the color band to create neon effect.

2. The light guide strip structure with neon effect as claimed in claim 1, wherein the ratio of the cross-sectional area of the main body to the cross-sectional area of the color band ranges from about 20:1 to 90:1.

3. The light guide strip structure with neon effect as claimed in claim 1, wherein the main body is a flexible strip body.

4. The light guide strip structure with neon effect as claimed in claim 2, wherein the main body is a flexible strip body.

5. The light guide strip structure with neon effect as claimed in claim 1, wherein the color band is positioned at the axis of the main body.

6. The light guide strip structure with neon effect as claimed in claim 3, wherein the color band is positioned at the axis of the main body.

7. The light guide strip structure with neon effect as claimed in claim 1, wherein the color band is coated with silver material.

8. The light guide strip structure with neon effect as claimed in claim 3, wherein the color band is coated with silver material.

9. The light guide strip structure with neon effect as claimed in claim 1, wherein the color band is red.

10. The light guide strip structure with neon effect as claimed in claim 3, wherein the color band is red.

11. The light guide strip structure with neon effect as claimed in claim 1, wherein the color band is made of a cross-linked polymer.

12. The light guide strip structure with neon effect as claimed in claim 3, wherein the color band is made of a cross-linked polymer.

13. The light guide strip structure with neon effect as claimed in claim 1, wherein the light ray is reflected to pass by the color band toward the other side of the main body.

14. The light guide strip structure with neon effect as claimed in claim 3, wherein the light ray is reflected to pass by the color band toward the other side of the main body.

15. The light guide strip structure with neon effect as claimed in claim 1, wherein the light ray is totally reflected to pass by the color band toward the other side of the main body.

16. The light guide strip structure with neon effect as claimed in claim 3, wherein the light ray is totally reflected to pass by the color band toward the other side of the main body.

17. The light guide strip structure with neon effect as claimed in claim 1, wherein multiple color bands are arranged along the axis of the main body at intervals.

18. The light guide strip structure with neon effect as claimed in claim 3, wherein multiple color bands are arranged along the axis of the main body at intervals.

19. The light guide strip structure with neon effect as claimed in claim 1, wherein multiple rows of color bands are embedded in the main body in parallel to each other.

20. The light guide strip structure with neon effect as claimed in claim 3, wherein multiple rows of color bands are embedded in the main body in parallel to each other.

21. The light guide strip structure with neon effect as claimed in claim 1, wherein the light ray is transmitted in such a manner that the light ray is refracted and reflected between the main body and the color band and scattered from the surface of the main body.

22. The light guide strip structure with neon effect as claimed in claim 3, wherein the light ray is transmitted in such a manner that the light ray is refracted and reflected between the main body and the color band and scattered from the surface of the main body.

23. The light guide strip structure with neon effect as claimed in claim 1, wherein the main body is composed of two halves.

24. The light guide strip structure with neon effect as claimed in claim 3, wherein the main body is composed of two halves.

25. The light guide strip structure with neon effect as claimed in claim 23, wherein each of the two halves has a plane face and the color band is disposed on the plane face of at least one of the two halves.

26. The light guide strip structure with neon effect as claimed in claim 25, wherein the color band is printed on the plane face of the half.

27. The light guide strip structure with neon effect as claimed in claim 23, wherein the two halves are adhered to each other by means of an adhesive.

28. The light guide strip structure with neon effect as claimed in claim 25, wherein the two halves are adhered to each other by means of an adhesive.

29. The light guide strip structure with neon effect as claimed in claim 23, wherein each of the two halves has a plane face, the plane faces of the two halves are thermally connected with each other.

30. The light guide strip structure with neon effect as claimed in claim 25, wherein the plane faces of the two halves are thermally connected with each other.

31. The light guide strip structure with neon effect as claimed in claim 1, wherein the color band has the form of a character or a figure.

32. The light guide strip structure with neon effect as claimed in claim 3, wherein the color band has the form of a character or a figure.

\* \* \* \* \*